United States Patent
Feng et al.

(10) Patent No.: US 12,242,422 B2
(45) Date of Patent: Mar. 4, 2025

(54) DATA PROCESSING SYSTEM AND METHOD OF AUTOMATICALLY INITIATING PROCESS

(71) Applicants: DIGIWIN CO., LTD., Shanghai (CN); DATA SYSTEMS CO., LTD., New Taipei (TW)

(72) Inventors: Lei Feng, Shanghai (CN); Guoxin Sun, Shanghai (CN)

(73) Assignees: DIGIWIN CO., LTD., Shanghai (CN); DATA SYSTEMS CO., LTD., New Taipei (TW)

( * ) Notice: Subject to any disclaimer, the term of this patent is extended or adjusted under 35 U.S.C. 154(b) by 0 days.

(21) Appl. No.: 18/305,367

(22) Filed: Apr. 23, 2023

(65) Prior Publication Data
US 2024/0264978 A1  Aug. 8, 2024

(30) Foreign Application Priority Data
Feb. 2, 2023  (CN) .......................... 202310091615.9

(51) Int. Cl.
*G06F 16/17* (2019.01)
(52) U.S. Cl.
CPC ................................ *G06F 16/1734* (2019.01)
(58) Field of Classification Search
CPC .................................................. G06F 16/1734
See application file for complete search history.

(56) References Cited

U.S. PATENT DOCUMENTS

| | | | |
|---|---|---|---|
| 2014/0281535 A1* | 9/2014 | Kane ................... | G06F 21/6209 713/168 |
| 2017/0200476 A1* | 7/2017 | Chen ...................... | G06F 16/13 |
| 2021/0209065 A1* | 7/2021 | Rakshit ................. | G06F 16/178 |
| 2022/0283560 A1* | 9/2022 | Teo ....................... | G06F 16/9577 |

* cited by examiner

*Primary Examiner* — Jay A Morrison
(74) *Attorney, Agent, or Firm* — JCIPRNET

(57) ABSTRACT

A data processing system and a method of automatically initiating a process. The data processing system includes a local server and a cloud server. The cloud server includes a storage apparatus and a processor. The processor is coupled to the storage apparatus, and configured to executed a file identification-parsing device and a detection system. The local server outputs a file to the cloud server, such that the file identification-parsing device performs an identification-parsing operation to generate a file content. The cloud server stores the file content in a database. The detection system performs a detection operation on the database to generate a file change content. The detection system generates business process information according to the file change content, and outputs the business process information to a process system. The process system executes the business process information, and displays manual operation information and an execution result on a display screen.

10 Claims, 4 Drawing Sheets

DATA PROCESSING SYSTEM AND METHOD OF AUTOMATICALLY INITIATING PROCESS

CROSS-REFERENCE TO RELATED APPLICATION

This application claims the priority benefit of Chinese application no. 202310091615.9, filed on Feb. 2, 2023. The entirety of the above-mentioned patent application is hereby incorporated by reference herein and made a part of this specification.

BACKGROUND

Technical Field

The disclosure relates to a data processing technique, in particular a data processing system and a method of automatically initiating a process.

Description of Related Art

Generally speaking, a component/part demander (e.g., an assembly factory/an original equipment manufacturer (OEM)) need to provide different component/part specification files to different manufacturers, and a manufacturer also need to confirm and receive multiple specification files from different OEMs. In this regard, the existing practice is that when the OEM adds or modifies the specification data of a component/part, personnel of the OEM stores the specification file in a specific address for personnel of the manufacturer to proactively download and use. Therefore, the manufacturer need to rely on an amount of of manpower to conduct regular inspections, and manually determine the required specification files from multiple specification files. Therefore, the manufacturer consumes an amount of labor cost in performing tedious and repetitive work. Furthermore, the manufacturer need to rely on multiple employees to conduct a review process to prevent occurrences of human error and component/part specification errors.

SUMMARY

The disclosure is directed to a data processing system and a method of automatically initiating a process, in which a corresponding business process may be accurately and automatically initiated according to newly added or modified files.

According to an embodiment of the disclosure, a data processing system includes a local server and a cloud server. The local server is configured to receiving a file. The cloud server includes a processor and a storage apparatus. The storage apparatus stores a file identification-parsing device, a detection system, and a database. The processor is coupled to the storage apparatus and configured to execute the file identification-parsing device and the detection system. The local server outputs the file to the cloud server. The cloud server performs an identification-parsing operation on the file through the file identification-parsing device to generate a file content. The cloud server stores the file content in the database, and performs a detection operation on the database through the detection system to generate a file change content. The detection system generates business process information according to the file change content.

According to an embodiment of the disclosure, a method of automatically initiating a process includes the following. A file is output to a cloud server by a local server. A file identification-parsing device is executed by a processor, such that the file identification-parsing device performs an identification-parsing operation on the file and generates a file content. The file content is stored in a database by the cloud server. A detection system is executed by the processor, such that the detection system performs a detection operation on the database to generate a file change content. The detection system is executed by the processor, such that the detection system generates business process information according to the file change content.

Based on the foregoing, in the data processing system and the method of automatically initiating a process of the embodiment of the disclosure, the business process information is automatically output to the process system according to the addition or change of files to execute the corresponding business process.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
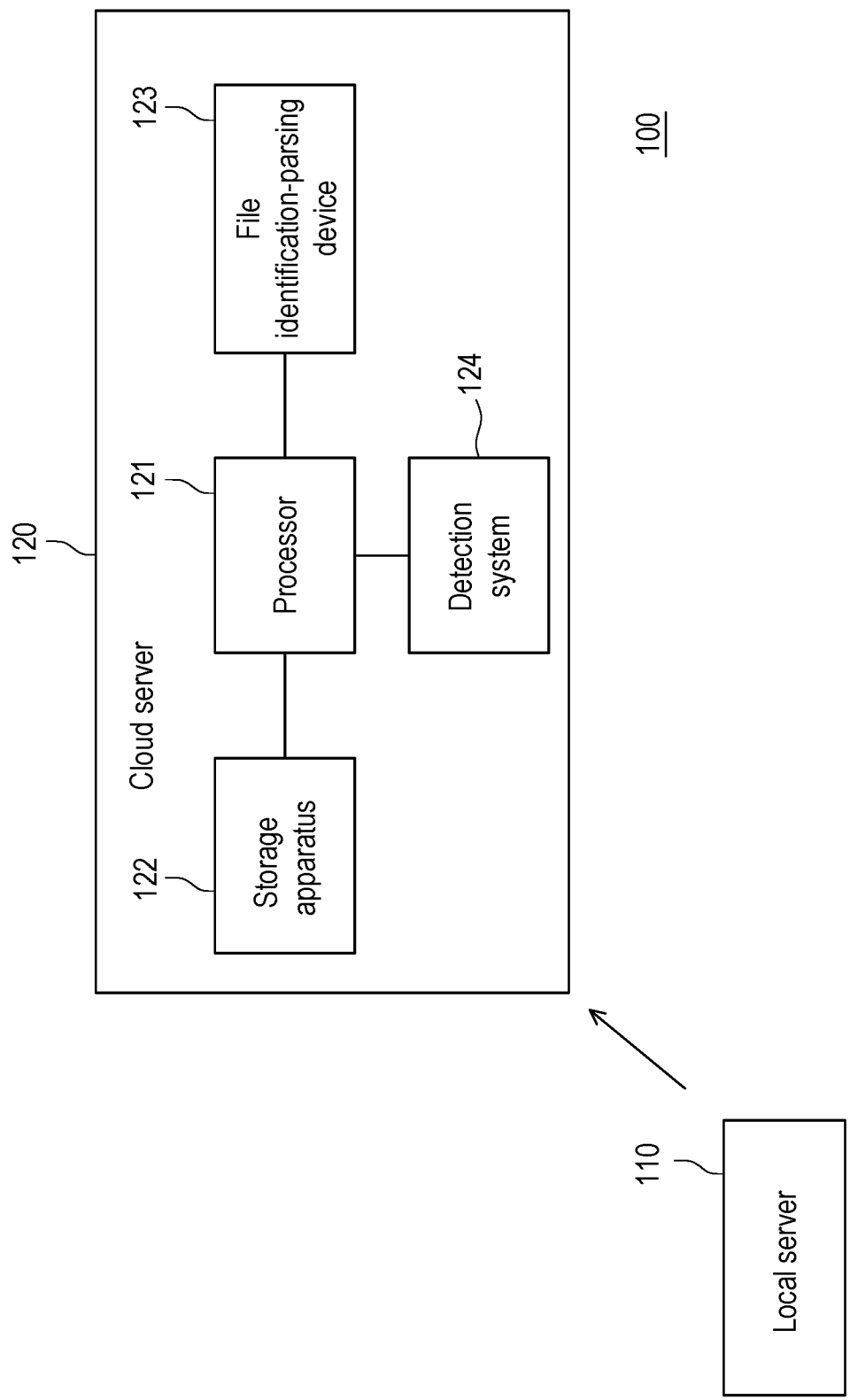
FIG. 1 is a schematic diagram of a data processing system of an embodiment of the disclosure.

Reference will now be made in detail to exemplary embodiments of the disclosure, examples of which are illustrated in the accompanying drawings. Wherever possible, the same reference numerals are used in the drawings and descriptions to refer to the same or like parts.

FIG. 1 is a schematic diagram of a data processing system of an embodiment of the disclosure. With reference to FIG. 1, a data processing system 100 includes a local server 110 and a cloud server 120. The cloud server 120 includes a processor 121, a storage apparatus 122, a file identification-parsing device 123, and a detection system 124. The processor 121 is coupled to the storage apparatus 122, the file identification-parsing device 123, and the detection system 124. The data processing system 100 may also include a communication interface or a data transmission interface (e.g., a terminal display) with actual circuit components, such that the processor 121 may communicate or perform data transmission with the process system. In this embodiment, the local server 110 and the cloud server 120, the server, the process system, and the detection system may each be realized in a cloud server or a enterprise internal private server, for example. The local server 110 and the cloud server 120, the server, the process system, and the detection system may also be integrated in a platform as a service (PaaS) system, and may execute multiple application programming interfaces (APIs) to call multiple program modules. In an embodiment, the program module refers to a program to execute specific functions according to data, for example, a program for scanning a database or executing a file and data in a shared folder according to timing settings, or, for example, a program for performing an identification-parsing operation on file data according to an identification-parsing rule or parsing settings, which is not limited by the disclosure.

In this embodiment, the processor 121 of the data processing system 100 may include, for example, a central processing unit (CPU), or any other programmable general-purpose or special-purpose microprocessor, digital signal processor (DSP), application specific integrated circuit (ASIC), programmable logic device (PLD), other similar processing circuits, or a combination of these devices.

The storage apparatus 122 may also realize a remote cloud storage service or a local data storage service. The storage apparatus 122 may include a memory and/or a database. The memory may be a non-volatile memory (NVM), for example. The storage apparatus 122 may store relevant programs, modules, systems, or algorithms for realizing the embodiments of the disclosure, to be accessed and executed by the processor 121 to realize relevant functions and operations described in the embodiments of the disclosure. The storage apparatus 122 may cache a file, a file content, a file change content, an identification-parsing rule, and a detection rule described in the embodiments of the disclosure.

The file described in the embodiments of the disclosure may refer to a part specification list/component parameter table formulated and generated by the part demander/OEM/orderer. Moreover, the file content is relevant data/values in the file read according to the identification-parsing rule. For example, the file content may include parameters related to components such as the demand date, the component type, the attribute, the specification, the batch, the manufacturer, and the adopted specification standard (e.g., the European standard or the American standard), and the disclosure is not limited thereto. The file change content is a difference between a previously detected file content and a currently detected file content. For example, the currently detected file content is that the specification of component A is 0.5 centimeter (cm), the specification (e.g., the length, the width, or the height) of component B is 1 cm, and the specification of component C is 2 cm; the previously detected file content is that the specification of component A is 0.5 cm, and the specification of component B is 0.7 cm. As such, the file change content is that the specification of component B is 1 cm.

Figure 2:
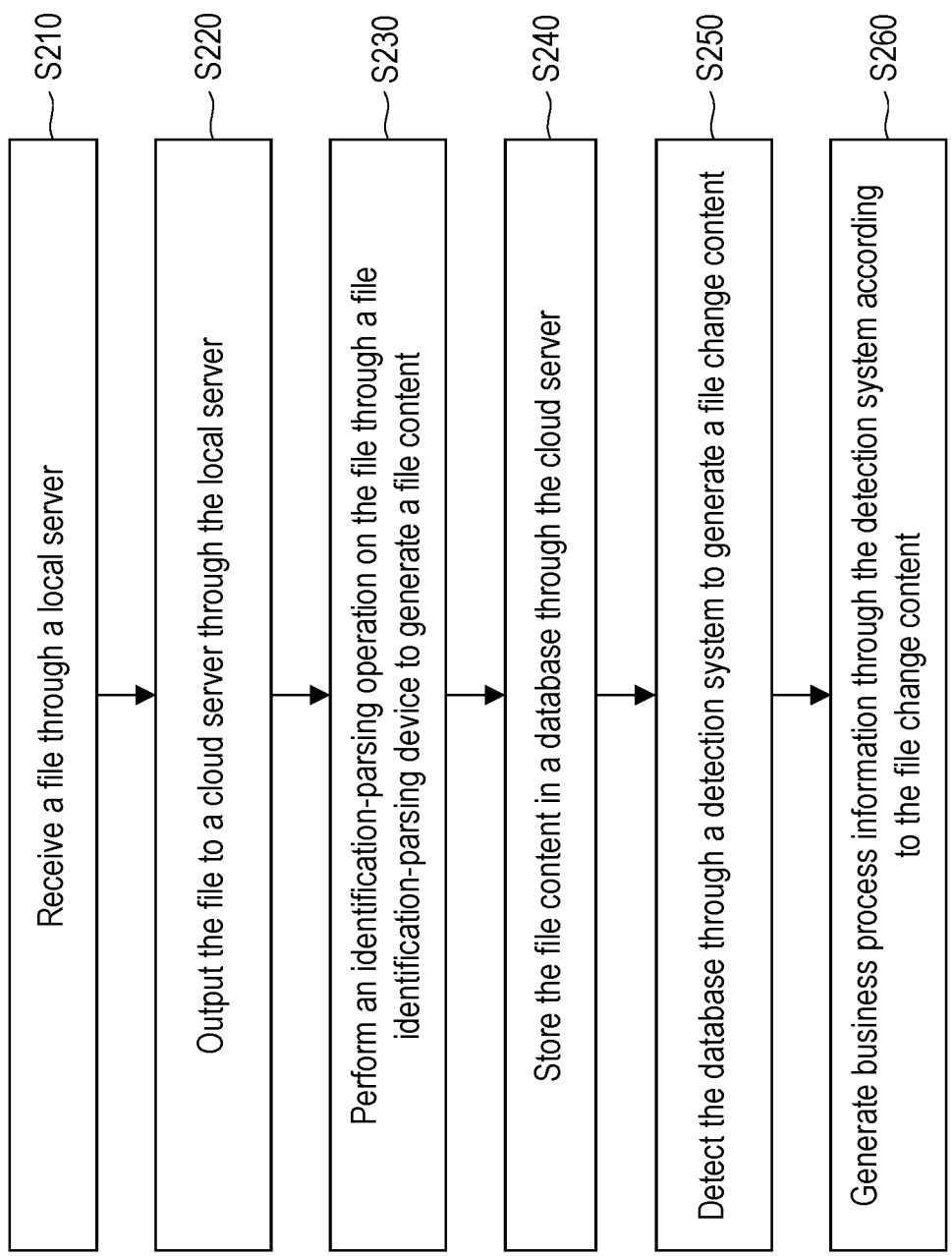
FIG. 2 is a flowchart of a method of automatically initiating a process of an embodiment of the disclosure.
Figure 3:
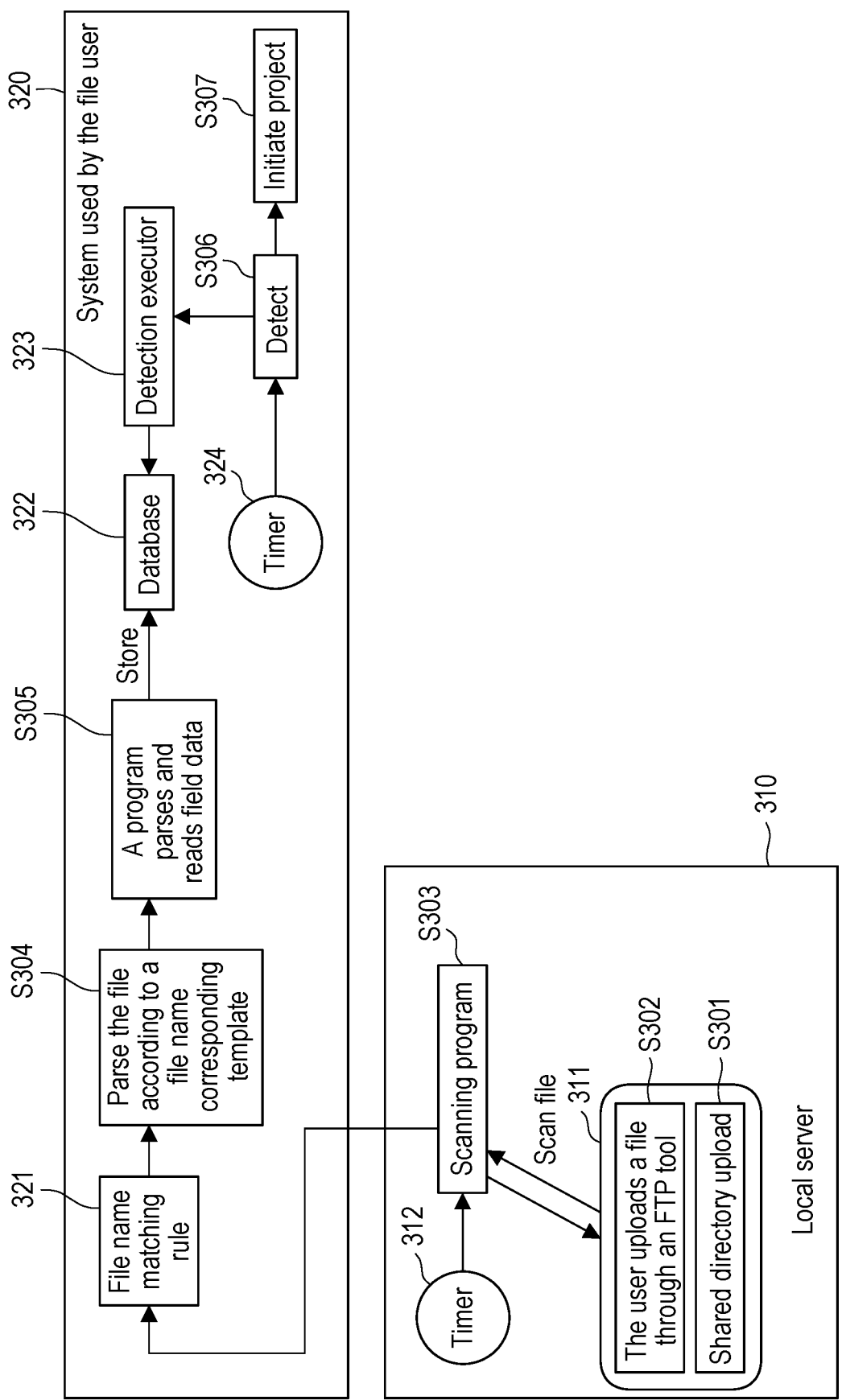
FIG. 3 is a schematic diagram of a data processing system of an embodiment of the disclosure.

FIG. 2 is a flowchart of a method of automatically initiating a process of an embodiment of the disclosure. FIG. 3 is a schematic diagram of a data processing system of an embodiment of the disclosure. With reference to FIG. 1 and FIG. 2, the storage apparatus 122 may store a file identification-parsing device 123 and a detection system 124. The file identification-parsing device 123 and the detection system 124 may be realized by JSON (JavaScript Object Notation), Extensible Markup Language (XML), YAML, or other programming languages, for example, and the disclosure is not limited thereto. The file identification-parsing device 123 may be configured to parse and identify a file stored in the storage apparatus 122, for example, to identify the file content (e.g., specification values, various parameters, and settings) related to manufacturing according to the identification-parsing rule. The detection system 124 may be configured to regularly detect the file content in a target/specific file storage block (e.g., a shared folder) according to a time setting value, for example, to detect and obtain the file change content between a current detection and a previous detection.

In this embodiment, the storage apparatus 122 and a database 322 may be the storage apparatus 122 configured in the data processing system 100, or a memory/storage block in the cloud server 120 or the local server 110/310. Moreover, the local server 110/310 may access a file (e.g., text data or file data) through the File Transfer Protocol (FTP), for example.

The data processing system 100 performs steps S210 to S260 as follows. In step S210, the file is received by the local server 110/310. With reference to FIG. 1, FIG. 2, and FIG. 3, in this embodiment, the local server 110/310 is a FTP server, and the local server 110/310 includes a terminal calculator 311. The terminal calculator 311 includes a file storage block (a shared folder). The FTP file storage block may be a FTP folder, for example. Specifically, step S210 may include further executing step S301 and step S302. In step S301, the user (e.g., the file manufacturer, the personnel in the OEM, the orderer, or the component demander) may configure a shared directory (i.e., a file storage block) according to the FTP. Then, in step S302, the user may upload the file (e.g., a part specification table) to the shared directory through the FTP server. In other words, the file issuer (e.g., the personnel of the OEM) saves/stores the generated file in the FTP shared directory of the local terminal (i.e., the terminal calculator), and the operating system of the terminal calculator automatically transfers the file to the FTP target directory on the local server through the FTP command through the preset FTP shared directory.

In step S220, the local server 110 outputs the file to the cloud server 120. In an embodiment, the local server 310 also includes a timer 312. Specifically, in step S303, the timer 312 regularly executes a scanning program on the file storage block according to detection configuration (step S303), and transmits the scanned file to a system used by the file user 320 (e.g., the cloud server 120). In other words, after the local server 310 running in a private deployment (e.g., the system of the OEM) checks that a new file is generated, the local server 310 uploads the file to the cloud server 120 through the FTP. The local server 310 stores the detection configuration. The detection configuration is the settings of the interval duration by which the timer 312 of the local server 310 scans and detects the shared directory of the local server 310, for example, scans the shared directory and transfers the scanned file to the system used by the file user 320 every 5 seconds. In an embodiment, the local server 310 uploads the file to the system used by the file user 320 through a secure channel.

In step S230, the processor 121 performs an identification-parsing operation on the file through the file identification-parsing device 123 to generate a file content. Specifically, the processor (e.g., the processor 121) of the system used by the file user 320 (e.g., the cloud server 120) performs the identification-parsing operation according to the identification-parsing rule stored in the storage apparatus 122 or in the database 322. The identification-parsing rule may include a file name matching rule 321, a file name corresponding template, an identification rule, and a parsing rule. Specifically, the system used by the file user 320 identifies the name structure of the file according to the file name matching rule 321, for example, compares whether the prefix or suffix of the file name includes specific words (e.g., component A, manufacturer B, batch code C) in the file name matching rule 321. In this embodiment, the system used by the file user 320 parses the file (step S304) according to the file name corresponding template (e.g., obtain the value when component A corresponds to manufacturing batch A1 and the manufacturer field is manufacturer C), to obtain the corresponding field data (i.e., the file content, such as manufacturer C, component A, specification of 1 inch) and store the field data in the database 322 (step S305).

In an embodiment, the storage apparatus 122 stores the identification-parsing rule. In addition, the identification-parsing operation described in the embodiments of the disclosure may be that the file identification-parsing device 123 converts the file into the file content according to the identification-parsing rule. The file content may be in the form of data. The file content may be the domain name, data, and value of the table in the file, for example. The file is a structured text file or an unstructured file. In step S240, the processor 121 stores the file content in the database 322 through the processor 121 of the cloud server 120.

In another embodiment, the identification-parsing rule includes at least one of a file name identification rule, an in-file annotation identification rule, and an in-file manufacturer identification rule to improve the accuracy in file identification and detection of the data processing system 100. Specifically, the file name identification rule includes identifying the file name structure and identifying the file name suffix. As such, the file identification-parsing device 123 may identify the file name of each file according to the file name identification rule. Moreover, identifying the file name structure may be identifying the distinguishing symbol (i.e., the connection character) and customized section information (e.g., the prefix field, the middle field, and the suffix field) of the file name structure, for example. The distinguishing symbol may be "-" or "_", for example. The section information may be a field customized by a user 430, for example, "Dul", "Order" or "Component", and the disclosure is not be limited thereto.

In an embodiment, the identification-parsing rule may include a comparison table of customized fields and connection characters corresponding to different orderers (e.g., OEMs). In other words, the file identification-parsing device 123 may first use the identification-parsing rule of the corresponding source (e.g., OEM A, OEM B, or part demander C) according to the source of the file to improve the accuracy and identification efficiency of file identification. In this embodiment, according to the identification-parsing rule, the file identification-parsing device 123 may automatically determine information of the corresponding file, for example, orderer information, manufacturer, manufacturing parts, manufacturing batch, demand quantity, specification standard, demand date, and part specification.

In an embodiment, the in-file annotation identification rule includes reading the file type description of the first line in the file (i.e., the field of the first line in the file) to retrieve information about the type in the file content. As such, the file identification-parsing device 123 may distinguish between different file contents (e.g., distinguish European or American standards for products in the file). The in-file annotation identification rule may include a field name for determination and different types of identifier segment information in the file. In other words, the in-file annotation identification rule may include a comparison table of corresponding fields and corresponding types (e.g., fields such as "adopted standard", "standard", and "ISO") appearing in the file. Moreover, the manufacturer identification rule includes a field name for determining a corresponding manufacturer 431 in the file to associate the relevant file content with the corresponding manufacturer 431. For example, the part orderer (e.g., the OEM) uploads a specification file to the cloud server 120 through the FTP. In the file, there are two manufacturing/demand batches in the same period, which are manufactured by two manufacturers 431 at the same time. Therefore, it is indicated in the file that manufacturer A and manufacturer B share this specification file. As such, the file identification-parsing device 123 may determine the manufacturer corresponding to each file and each information in the file according to the manufacturer identification rule.

In this embodiment, after reading the file, the file identification-parsing device 123 may first use the file name identification rule to parse the prefix, middle, and suffix information that may be distinguished and may be determined in the file name. Then, the field information in the file is identified according to the in-file annotation identification rule and the in-file manufacturer identification rule. As such, the file identification-parsing device 123 may determine the file type and information of the file according to the identification-parsing rule.

In step S250, the processor 121 detects the database 322 through the detection system 124 to generate a file change content. Specifically, the detection system 124 may include a detection executor 323 and a timer 324. In step S306, the timer 324 outputs a detection instruction to the detection executor 323 at a default time (i.e., a preset time setting value), such that the detection executor 323 performs a detection operation. The detection operation performed by the detection executor 323 may be detecting newly added data and modified data in the database 322 between the time points of a previous detection operation and a current detection operation. In other words, the detection executor 323 detects the data change content between the two time points (i.e., the time point of the previous detection operation and the time point of the current detection operation). Moreover, the detection executor 323 generates the file change content according to the data change content. The storage apparatus 122 stores a previous detection record, a current detection record, and a historical detection record.

In step S260, the processor 121 may execute the detection system 124 to generate business process information through the detection system 124 according to the file change content. The business process information may be information or an instruction for initiating a project. In other words, the detection executor 323 may initiate a business process corresponding to the file change content according to a detection rule 424. For example, the detection executor 323 initiates a project of partial specification change (step S307) according to the file change content (e.g., the size of component A in lot number 001 is 2 cm) to automatically modify the specification data (e.g., the size of component A in lot number 001 is changed to 2 cm) in the manufacturing system of the manufacturer.

In another embodiment, the rules, files, and record data of this embodiment may also be recorded by use the cache service. Moreover, the caching service may be realized by the cloud server 120 to be accessed through the Hypertext Transfer Protocol. Alternatively, the record data may also be stored in the form of file data, and data interaction and transmission may be performed through inter-process communication or operating file interfaces in the operating system.

Figure 4:
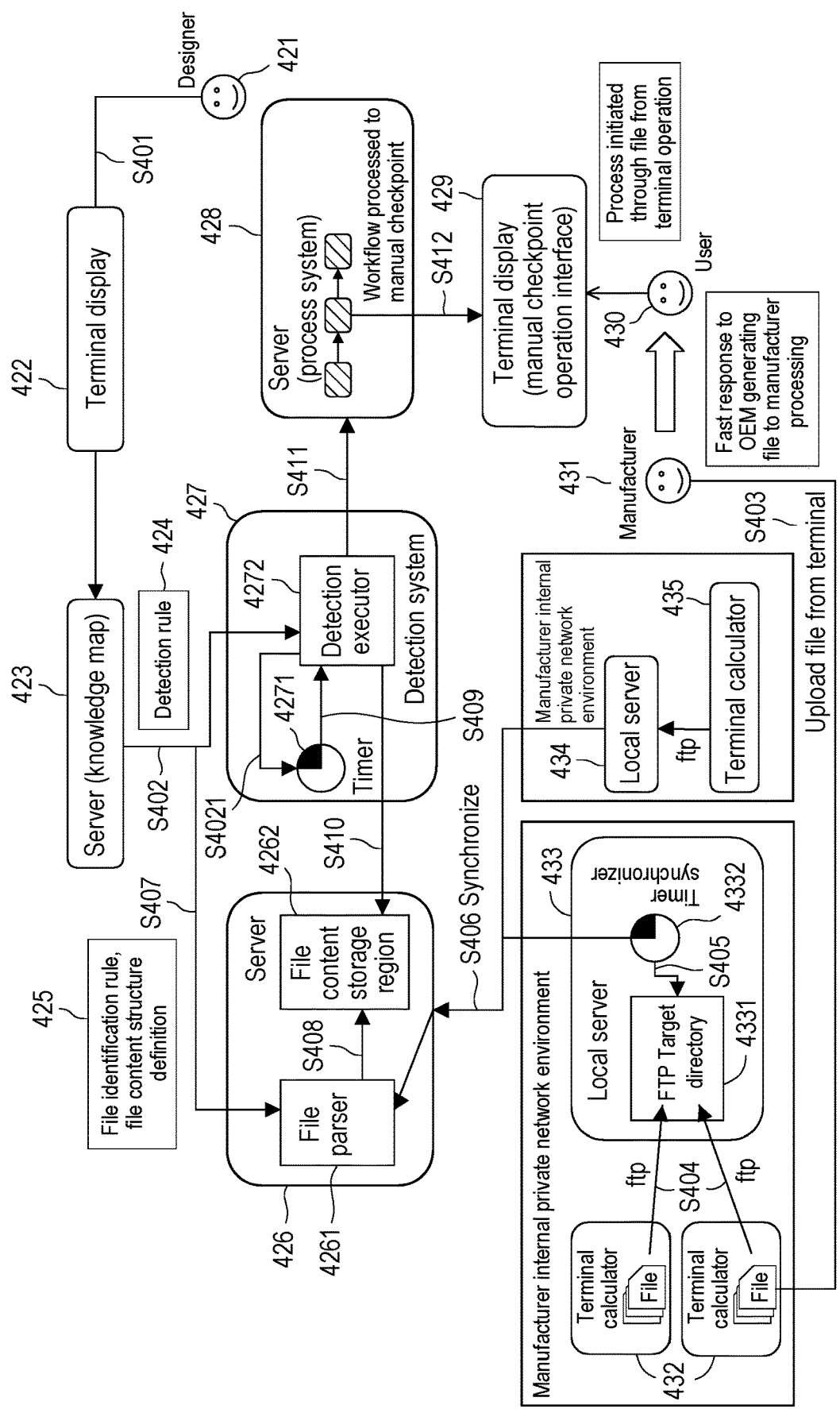
FIG. 4 is a flowchart of a method of automatically initiating a process of an embodiment of the disclosure.

FIG. 4 is a flowchart of a method of automatically initiating a process of an embodiment of the disclosure. With reference to FIG. 1, FIG. 2, and FIG. 4, in this embodiment, the data processing system 100 also includes a terminal display 422. The terminal display 422 is configured to receive an identification-parsing rule, and the terminal display 422 stores the identification-parsing rule in an identification-parser (i.e., a file parser 4261). The terminal display 422 may be a designing device, for example. The identification-parsing rule may include an identification task, an identification rule, a detection rule 424, and a flow of the subsequent flow system. Specifically, a designer 421 (e.g., the designer of the detection and identification rules) inputs the identification-parsing rule (including the file identification rule 425 and a file content structure definition) and the detection rule 424 to the terminal display 422 (step S401). The designer 421 may set relevant rules and input the rules to the terminal display 422 through an input devices (e.g., a keyboard, a mouse, a universal serial bus interface) or wireless transmission (e.g., Bluetooth or Internet), and the disclosure is not limited thereto.

In an embodiment, the data processing system 100 also includes a server 423. The server 423 is configured to store knowledge map information. The knowledge map information includes the identification-parsing rule and the detection rule 424. In this embodiment, after receiving the detection rule 424, the terminal display 422 outputs the detection rule 424 and the identification-parsing rule to the server 423. Then, the server 423 outputs the detection rule 424 to a detection system 427 (step S402), and the server 423 outputs the identification-parsing rule to a file identification-parsing device (i.e., another server 426) (step S407).

In an embodiment, the manufacturer 431 may be the person in charge of the specification of the OEM or the specification designer of the orderer, for example. In step S403, the manufacturer 431 inputs the file to the terminal device (e.g., a desktop computer, a smart phone, and a terminal calculator 432, among other electronic devices). In step S404, the terminal calculator 432 automatically uploads the file to an FTP target directory 4331 (i.e., an FTP folder) of a local server 433 according to the FTP.

During the transmission process of the FTP, the manufacturer 431 first puts the file in the specified FTP shared directory in the terminal calculator 432. Then, the operating system of the terminal calculator 432 uploads the file in the FTP shared directory to the local server 433. In other words, the operating system may create an FTP folder and provide an FTP path (equivalent to an FTP image). As such, when the manufacturer 431 puts the file (e.g., specification parameters related to the manufacturing specification) to the FTP shared directory of the terminal calculator 432, the operating system automatically uploads the file to the local server 433.

In other words, after the manufacturer 431 stores the file in the shared folder of the terminal calculator, the terminal calculator 432 automatically uploads the file to the FTP target directory 4331 according to the settings of the FTP. In step S405, a timer 4332 performs a detection operation on the FTP target directory 4331 according to a set time value (e.g., detection once every five minutes, detection once every ten minutes, and detection once every hour) to automatically upload the file in the FTP target directory to the server 426 (step S406), and also remove the file in the FTP target directory in the local server 433.

In step S408, the file parser 4261 (i.e., the file identification-parsing device 123) of the server 426 performs an identification-parsing operation on the received file according to the file identification rule to obtain a file content, and stores the file content in the database (i.e., a file content storage region 4262).

In step S409, a timer 4271 of the detection system 427 regularly sends a detection instruction to a detection executor 4272 according to a detection time setting value, such that the detection executor 4272 detects the file content in the file content storage region 4262 (step S410). Moreover, the detection executor 4272 of the detection system 427 performs a detection operation on the file content in the file content storage region 4262 to obtain a file change content. In another embodiment, the detection system 427 may also run on another server. As such, the detection system 427 running on the server regularly detects data in a file content database (i.e., the file content storage region 4262).

In step S411, the detection system 427 outputs the file change content to the process system (i.e., another server 428). As such, the process system automatically initiates corresponding business process information according to the file change content.

In another embodiment, the detection system 427 generates the corresponding business process information according to the detection rule 424 and the file change content, and the detection system 427 outputs the business process information to the process system. In other words, when the detection system 427 finds a new file content or a change in the file content (i.e., the file change content), the detection system 427 may automatically initiate the process according to the business type of the file change content. In other words, the detection system 427 may initiate the business process corresponding to the file change content according to the detection rule 424, and output the business process information to the process system.

In an embodiment, the process is ultimately aimed at manual task processing. Manual task processing may be approval of new work orders, data modification orders, or value adjustment orders, for example. In this embodiment, the data processing system 100 also includes another terminal display 429. After the process system (i.e., the server 428) executes the business process information, the process system displays an execution result of the business process and manual operation information (e.g., manual task processing) on a display screen of the terminal display 429 (step S412). Therefore, the user 430 may operate the business process initiated through the terminal display 429 (i.e., a manual checkpoint operation interface) according to the file. The manual checkpoint may be the above-mentioned manual task processing, for example. The manual checkpoint operation interface may be an electronic device, for example, a touch display, a computer display, a touch panel, and the like.

In summary of the foregoing, in the data processing system 100 and the method of automatically initiating a process of the embodiment of the disclosure, the business process information may be output to the process system through the identification-parsing rule and the detection rule 424 according to the addition or change of the file. As such, in the data processing system 100 and the method of automatically initiating a process, a business process corresponding to the file change content is automatically initiated to effectively improve the efficiency of data processing, and reduce the manpower cost and time cost required by the manufacturer in processing specification files.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A data processing system comprising:
a local server configured to receiving a file; and
a cloud server, communicably connected to the local server, wherein the cloud server comprises:
a storage apparatus configured to stores a file identification-parsing device, a detection system, and a database,
a processor, coupled to the storage apparatus, and configured to execute the file identification-parsing device and the detection system,
wherein the local server is configured to output the file to the cloud server,
wherein the cloud server is configured to perform an identification-parsing operation on the file through the file identification-parsing device to generate a file content,
wherein the cloud server is configured to store the file content in the database, and performs a detection operation on the database through the detection system to generate a file change content, and
wherein the processor is configured to execute the detection system to generate business process information according to a detection rule and the file change content, and the detection system outputs the business process information to a process system;
wherein the data processing system comprises a terminal display, wherein the process system executes the business process information, and the process system displays an execution result and manual operation information on a display screen of the terminal display;
wherein the storage apparatus stores an identification-parsing rule, and the identification-parsing operation is the file identification-parsing device converting the file into the file content according to the identification-parsing rule to improve the accuracy in file identification, wherein the identification-parsing rule comprises at least one of a file name identification rule, an in-file annotation identification rule, and an in-file manufacturer identification rule;
wherein the local server comprises a timer, wherein the timer regularly scans a file storage block according to detection configuration, and transmits the scanned file to the cloud server.

2. The data processing system according to claim 1, wherein the local server is a File Transfer Protocol server, and the local server comprises the file storage block.

3. The data processing system according to claim 1, further comprising a terminal display, wherein the terminal display is configured to receive an identification-parsing rule, and the terminal display stores the identification-parsing rule in the file identification-parsing device.

4. The data processing system according to claim 1, wherein the detection system comprises a detection executor and a timer, wherein the timer outputs a detection instruction to the detection executor at a default time, such that the detection executor performs the detection operation,
wherein the detection executor executing the detection operation is detecting newly added data and modified data in the database between a previous detection operation and a current detection operation to generate the file change content, wherein the storage apparatus stores a previous detection record, a current detection record, and a historical detection record.

5. The data processing system according to claim 3, further comprising a server configured to store knowledge map information, wherein the knowledge map information comprises the identification-parsing rule and a detection rule, wherein the terminal display receives the detection rule and outputs the detection rule to the server, wherein the server outputs the detection rule to the detection system, and the server outputs the identification-parsing rule to the file identification-parsing device.

6. A method of automatically initiating a process, the method comprising:
outputting a file to a cloud server by a local server;
executing a file identification-parsing device by a processor, such that the file identification-parsing device performs an identification-parsing operation on the file and generates a file content;
storing the file content in a database by the cloud server, and executing a detection system by the processor, such that the detection system performs a detection operation on the database to generate a file change content;
executing the detection system by the processor, such that the detection system generates business process information according to the file change content; and
storing an identification-parsing rule by a storage apparatus, wherein the identification-parsing operation is converting the file into the file content by the file identification-parsing device according to the identification-parsing rule, wherein the identification-parsing rule comprises at least one of a file name identification rule, an in-file annotation identification rule, and an in-file manufacturer identification rule;
wherein the detection system generating the business process information according to the file change content comprises:
generating the business process information by the detection system according to a detection rule and the file change content;
outputting the business process information to a process system by the detection system;
executing the business process information by the processor through the process system; and
displaying an execution result and manual operation information on a display screen of a terminal display by the processor through the process system;
wherein the local server comprises a timer, and outputting the file to the cloud server by the local server comprises:
regularly scanning a file storage block by the timer according to detection configuration, and transmitting the scanned file to the cloud server by the local server.

7. The method according to claim 6, wherein the local server is a File Transfer Protocol server, and the local server comprises the file storage block.

8. The method according to claim 6, further comprising:
receiving an identification-parsing rule by a terminal display; and
storing the identification-parsing rule in the file identification-parsing device by the terminal display.

9. The method according to claim 6, wherein performing the detection operation on the database to generate the file change content comprises:
outputting a detection instruction to a detection executor of the detection system at a default time by a timer, such that the detection executor performs the detection operation, wherein the detection executor executing the detection operation is detecting newly added data and modified data in the database between a previous detection operation and a current detection operation to generate the file change content; and storing a previous detection record, a current detection record, and a historical detection record by a storage apparatus.

10. The method according to claim 8, further comprising:

storing knowledge map information by the processor through a server, wherein the knowledge map information comprises the identification-parsing rule and a detection rule;

receiving the detection rule by the terminal display, and outputting the detection rule to the server by the terminal display;

outputting the detection rule to the detection system by the server; and outputting the identification-parsing rule to the file identification-parsing device by the server.

* * * * *